United States Patent [19]

Copperwheat

[11] 4,191,280
[45] Mar. 4, 1980

[54] MECHANICAL LINK MEMBERS

[75] Inventor: Cyril Copperwheat, Ampthill, England

[73] Assignee: Uni-Drive (Tractors) Limited, Bedfordshire, England

[21] Appl. No.: 825,356

[22] Filed: Aug. 17, 1977

[30] Foreign Application Priority Data

Aug. 23, 1976 [GB] United Kingdom ............... 35067/76
Jan. 5, 1977 [GB] United Kingdom ............... 00239/77

[51] Int. Cl.² ............................................. F16F 9/44
[52] U.S. Cl. ..................... 188/300; 172/439; 172/444; 188/312; 188/313; 188/321; 248/354 H; 267/8 R
[58] Field of Search ............... 188/300, 312, 319, 321, 188/313; 172/439, 444; 267/34, 8 R, 170; 248/354 H; 403/56, 77, 343, 342; 91/437

[56] References Cited

U.S. PATENT DOCUMENTS

| | | | |
|---|---|---|---|
| 2,228,865 | 1/1941 | Bird ................... | 188/300 X |
| 2,553,912 | 5/1951 | Gervais ................ | 188/312 |
| 2,630,193 | 3/1953 | Funkhauser ............ | 188/312 |
| 2,716,470 | 8/1955 | Focht ................. | 188/312 |
| 2,851,904 | 9/1958 | Banek . | |
| 3,024,067 | 3/1962 | Brandoli . | |
| 3,053,526 | 9/1962 | Kendall ............... | 188/312 X |
| 3,236,515 | 2/1966 | Ackerman ............. | 188/300 X |
| 3,264,899 | 8/1966 | Swan . | |
| 3,356,186 | 12/1967 | Lambers .............. | 188/300 X |
| 3,905,425 | 9/1975 | Jackson .............. | 188/300 X |

FOREIGN PATENT DOCUMENTS 124807 6/1972 Norway .
974312 11/1964 United Kingdom .

Primary Examiner—George E. A. Halvosa
Attorney, Agent, or Firm—Seidel, Gonda, Goldhammer & Panitch

[57] ABSTRACT

A mechanical link member is provided which is easily variable in length for ease of connection yet rigid in operation by the use of hydraulic valve and screw-type adjustments. In addition to an interrupted flow position which prevents relative axial movement of the ends of the link member, the hydraulic valve has full flow and restricted flow positions to control the rate of length adjustment. A spring positions the mechanical link to a midrange position when the hydraulic valve is opened and the link ends are not attached to a load.

4 Claims, 3 Drawing Figures

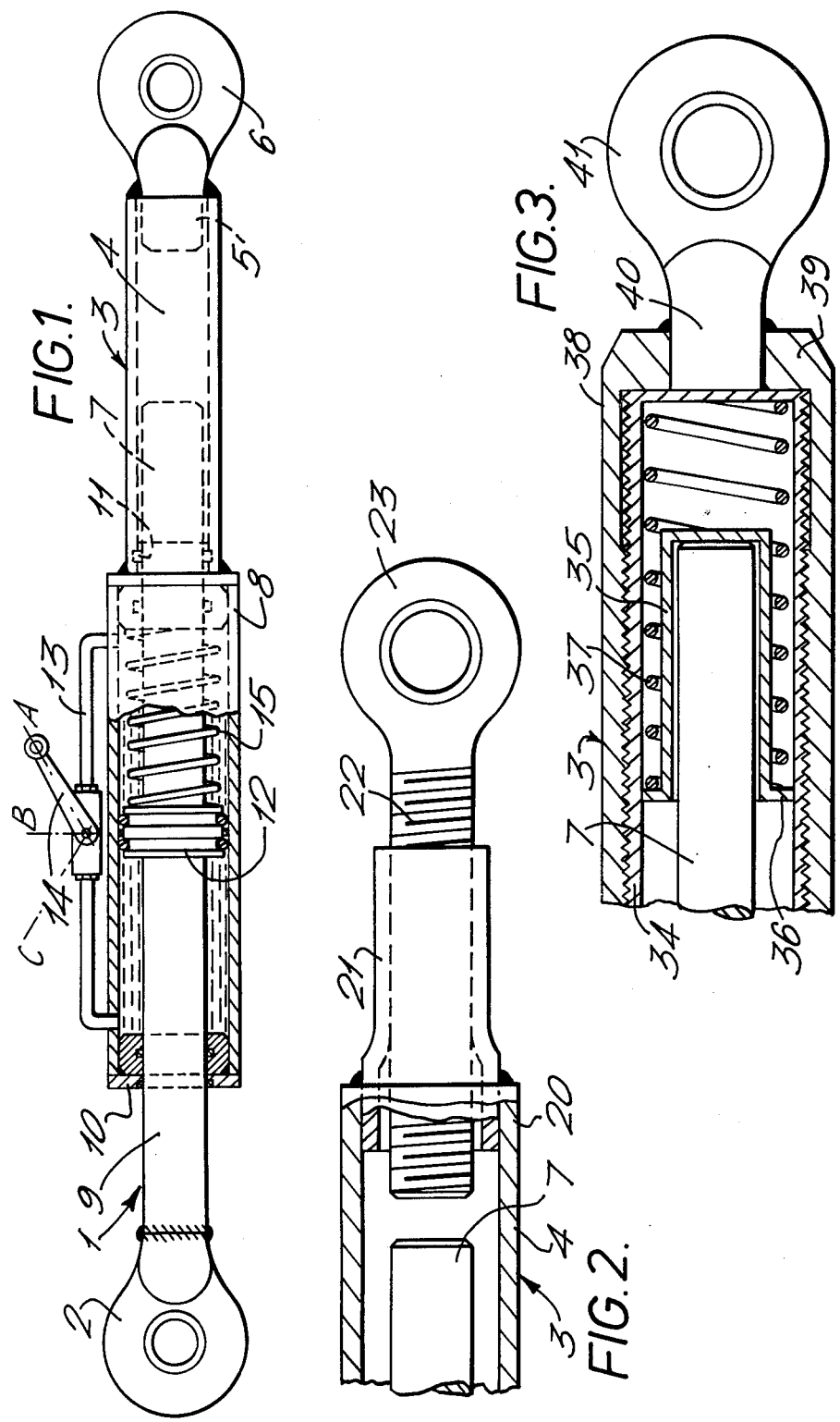

MECHANICAL LINK MEMBERS

This invention relates to variable length mechanical link members, particularly of the type used as the top link in three point linkages on tractors.

In accordance with the general concept of the invention there is provided a variable length mechanical link member for force transmission having two link member elements which are arranged longitudinally of the link member and which define together a double acting piston and cylinder unit the cylinders of which are interconnected by a conduit which is closable to prevent fluid flow between the cylinders and so to prevent relative movement of the link member elements.

In a preferred form of the invention there is provided a variable length mechanical link member for force transmission comprising first and second link member elements having first ends relatively moveable axially of the link member and adapted for connection to respective machine elements between which a force is to be transmitted and second ends co-operating together to form a double acting piston and cylinder unit, a conduit interconnecting the cylinders and forming therewith a closed hydraulic circuit, and means in said conduit for interrupting the fluid flow in the circuit whereby to prevent relative axial movement of said first ends.

Preferably the means for interrupting the flow in the circuit has, in addition to a circuit closed condition, a condition in which the flow rate in the conduit is relatively small and a condition in which the flow rate in the conduit is relatively large.

In a further preferred embodiment of the invention spring means is provided in order to assist axial extension of the member by urging said link member elements apart.

In a still further preferred embodiment of the invention one of said link member elements includes two coaxial mutually threadedly engaged portions, whereby relative rotation of said portions varies the length of the link member independently of relative longitudinal movement of the link member elements.

Embodiments of the invention will now be described, by way of example only, with reference to the accompanying drawings in which, FIG. 1 is a longitudinal view, partly in section, of one embodiment of the invention;

FIG. 2 is a view of part of a second embodiment of the invention;

FIG. 3 is a view, in section, of part of a third embodiment of the invention.

The embodiments of the invention illustrated are top link members for use in three point tractor linkages. The same reference numerals are used for common elements in the three embodiments.

With reference to the embodiment shown in FIG. 1 a first link member element 1 includes a solid cylindrical bar 9 having welded to one end thereof the ball part 2 of a category I or category II connection. A second link member element 3 has an essentially tubular portion 4 in one end of which is received a spigot 5 carrying a further ball part 6 of a category I or category II connection. The other end of the tubular portion 4 of the second link member element 3 receives the other end 7 of the first link member element 1 so that these elements are relatively axially or longitudinally moveable in a telescopic manner.

Forming an extension of the tubular portion 4 is a second tubular portion 8 of larger diameter than the first tubular portion 4 and which encloses a substantial portion of the bar 9. The free end 10 of the second tubular portion 8 is sealingly slidable on the bar 9 and further sealing means 11 are provided adjacent the other end of the smaller tubular portion 4 in order to provide a sealed cavity defined by the second tubular portion 8. A piston element 12 is secured to the bar 9 and is in sealed sliding engagement with the radially inner surface of the second tubular portion 8 so as to divide the second tubular portion into two cylinder parts.

It will be seen therefore that the ends of the link member elements co-operate together to form a double-acting piston and cylinder unit. Since the bar 9 of the first link member element is telescopically received in the first tubular portion 4 of the second link member element the working area of each cylinder part is the same.

A conduit 13 connects the two cylinder parts and has its entry into the cylinder parts at points close to the respective sealing means. Valve means 14 is located in this conduit. The valve means has three positions A, B, C. A first position (A) of the valve means interrupts the flow in the conduit. A second position (B) of the valve means allows substantially full flow in the conduit. A third position (C) of the valve means provides a restricted flow of fluid in the conduit 13.

A relatively weak compression spring 15 is located in one of the cylinder units and urges the link member elements relatively axially or longitudinally apart.

In use of the link member shown in FIG. 1 as the top link of a three point tractor linkage the two ball part ends 2 and 6 are connected respectively to the tractor and to the frame of the three point linkage. Relative axial lengthening or shortening of the link member can be obtained by placing the control valve means 14 in its second position (B) in which full flow takes place between the two cylinder parts. Thus the two link member elements 2 and 3 can be readily pushed towards each other or conversely the compression spring 15 can be allowed to effect extension of the link member. In certain circumstances it is preferred that the variation in length of the link member takes place only very gradually and in this case the valve means 14 is placed into its third position (C) where only a restricted flow can occur between the cylinder parts and thus any variation in axial length takes place only slowly. When the desired length of the top link has been obtained the valve means 14 is placed in its first position to interrupt flow between the cylinder parts. Since the working medium is a substantially incompressible hydraulic fluid, further variation in length of the top link is prevented and force can be transmitted from one ball part of the category I or category II connection to the other ball part of the other connection within the strength limits of the top link member.

The top link described can be used to replace the screw type top link in common usage at the present time. It is also useful when used in connection with lifting means for use in connection with a three point linkage. By using the restricted flow position (C) of the valve means 14 the angular rotation of the lifting means can be adequately compensated for automatically during the lifting operation. The top link also provides for improving the ease of automatic coupling in which a three point linkage has to be moved from a lower to an upper position to engage within the frame members on the agricultural implement. By leaving the valve means of the link member described above in its second position with the link member fully extended, as the three point linkage is raised the top link is free to reduce in length to accommodate the relative positions of the tractor and agricultural implement.

The embodiment of the invention shown in FIG. 2 is similar to that of FIG. 1 except in that the end 20 of the tubular portion 4 of lesser diameter of the second link member element 3 has welded thereto a further tubular portion 21 of still smaller diameter which is threaded on its inner surface. Screw-threadedly mounted in this tubular portion 21 is a threaded spigot 22 carrying a ball part 23 of a category I or category II connection for connection to a respective machine element.

The threaded relationship of this ball part in the second link member element allows for fine adjustment of the length of the link member at the moment of connecting one machine element, e.g. a farm implement, to another machine element, e.g. a farm tractor. Such fine adjustment may be difficult to obtain, for example, in cold whether when ease of movement of the piston and cylinder unit may not be obtained.

The third embodiment of the present invention shown in FIG. 3 is similar to that of FIG. 1 except in that the ball-carrying tubular portion 34 of the second link member element 3 has its free end closed so that it is in the form of an elongated cup. A further cup-shaped element 35 of smaller diameter is located inside the said tubular portion 34 of the second link member element and is seated over the free end 7 of the cylindrical bar 9 of the first link member element 1. This cup-shaped element 35 is provided with a radially extending flange 36 which acts as a seat for one end of a coil spring 37 acting between the flange 36 and the said closed end of the tubular portion 34 of the second link member element 3.

When the valve means 14 is in its position permitting flow of fluid between the respective cylinder parts the compression spring 37 acts to assist the axial extension of the link member. The element 35 has a bore approximately equal in length to half that of the range of longitudinal movement of the link member so that the spring 37 tends to locate the piston centrally of the cylinder.

A sleeve 38 surrounds the tubular portion 34 of the second link member element 3. Substantially the entire internal surface of the sleeve is screw-threaded and is in co-operative engagement with a screw-threaded portion on the external surface of the tubular portion 34. The sleeve 38 has its end 39 closed and provided with a bore in which is secured by welding a spigot 40 carrying a ball part 41 of a category I or category II connection.

The sleeve may be rotated with respect to the tubular portion 34 of the second link member element 3 in order to provide the fine adjustment of the length of the link member in the circumstances already described in connection with the second embodiment of this invention.

In a modification of the embodments shown in the FIGS. 1 to 3 of the drawings the end 7 of the bar 9 is formed with an axially extending bore which receives a compression spring whose other end acts against the other link member element 3 to urge the piston 12 to a central position in the cylinder unit. This modification replaces the arrangements of spring shown in the Figures.

In a further modification of the embodiments illustrated in the drawings the conduit between the cylinder parts is formed in the piston 12 together with suitable valve means, so replacing the conduit 13 and valve means 14 of the illustrated embodiments. The valve means in the piston 12 may be solenoid operated, for example, with the current conducting leads passing along the interior of the bar 9.

What I claim is:

1. A variable length mechanical link member for force transmission, comprising:
   two link member elements having first ends for connection to respective machine elements and second ends cooperating together to form a double acting piston and cylinder unit,
   fluid flow conduit means interconnecting the cylinder spaces of said piston and cylinder unit,
   fluid flow control means in said conduit for interrupting fluid flow between the cylinder spaces,
   one of said link member elements being formed as a piston rod and having a piston mounted between the first connected end of said element and the free end of said piston rod, said piston dividing the cylinder into separate cylinder spaces,
   the other link member element comprising a first tubular portion forming said cylinder and a second tubular portion forming a closed-end bore in which is received the free end of said piston rod,
   a flanged cup-shaped element in said closed-end bore to accommodate said free piston rod end, and
   spring means acting between the flange and the closed-end of the bore urging said cup-shaped element against said free piston rod end.

2. A link member according to claim 1, wherein said other link member element has as its first end a socket member portion rotatably received on a threaded external surface portion of said link member.

3. A link member according to claim 1, wherein said spring means and cup-shaped element are of such a length as to tend to locate said piston centrally of said cylinder.

4. A link member according to claim 1 wherein said fluid control means is a valve which has three positions: a first position in which no fluid flow between the cylinder spaces is possible, and second and third positions in which fluid flow between the cylinder spaces is possible, the fluid flow possible in the second position being substantially the full flow allowed by the conduit means and being substantially greater than the restricted fluid flow possible in the third position.

* * * * *